May 7, 1968 R. C. REMPEL ETAL 3,382,452

FREQUENCY STABILIZATION APPARATUS

Original Filed Aug. 7, 1961

INVENTORS
MARTIN E. PACKARD
ROBERT C. REMPEL
ROBERT J. RORDEN
BYRON E. SWARTZ

BY W. Nolan
ATTORNEY

United States Patent Office 3,382,452

Patented May 7, 1968

3,382,452

FREQUENCY STABILIZATION APPARATUS

Robert C. Rempel and Byron E. Swartz, Santa Clara County, Martin E. Packard, San Mateo County, and Robert J. Rorden, Santa Clara County, Calif., assignors to Varian Associates, Palo Alto, Calif., a corporation of California Continuation of application Ser. No. 129,874, Aug. 7, 1961. This application Apr. 15, 1965, Ser. No. 448,496

19 Claims. (Cl. 331—3)

Figures 1, 2:
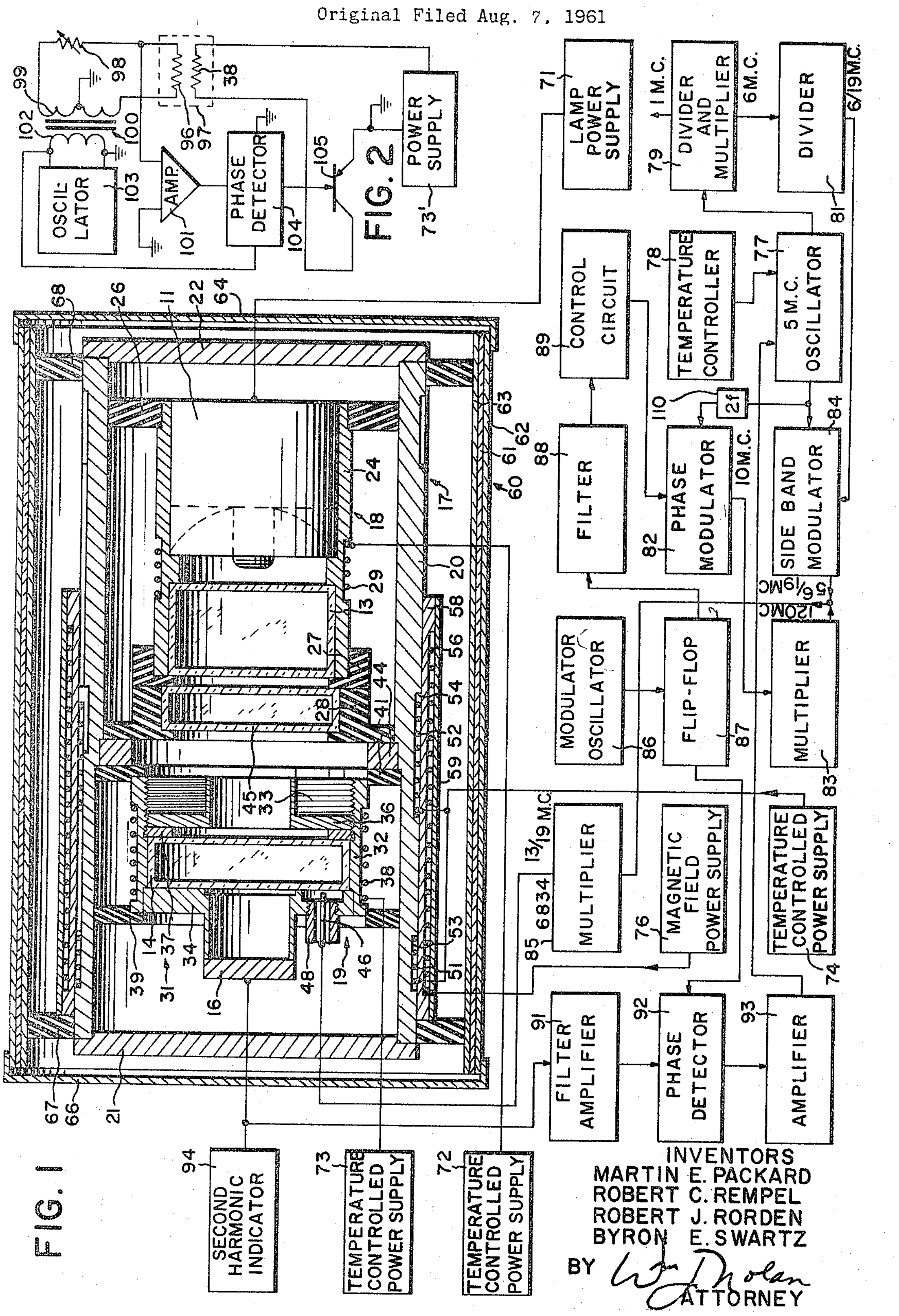

This application is a continuation of copending patent application Ser. No. 129,874, filed Aug. 7, 1961, and now abandoned.

This invention relates to frequency stabilization apparatus controlled by optical observation of a field independent hyperfine transition in alkali vapors and particularly, to frequency stabilization apparatus having a long term stability of $\pm 2\times 10^{-10}$ or better in any 90-day period.

U.S. Patent 3,159,797, assigned to the assignees of this application teaches an apparatus wherein a frequency which is the hyperfine frequency of the alkali vapor and which is coupled to a cavity resonator is phase modulated as a square wave function whereby no even harmonics of the fundamental modulation frequency are incorporated therein. This is done to increase the signal-to-noise ratio from a signal obtained from a light observing intensity means, such as a photocell, that is observing the optical transition in an absorption cell. An apparatus of this type that uses a square wave modulation function was found to be very sensitive to the frequency at which the modulation was performed and also to the phase angle through which the hyperfine frequency is shifted, wherein any slight deviation from optimum value causes the signal-to-noise ratio to drop rapidly. Thus, the apparatus is very sensitive to the frequency and amplitude of the square wave.

Another condition that affects the accuracy and stability of a frequency stabilization apparatus is a variable ambient temperature, because any slight change in temperature of the light absorption cell will appreciably shift the hyperfine frequency of the alkali vapor therein and decrease the stability of the apparatus. Stability is measured by the ratio $\Delta f$, that is, the change in frequency $\Delta f$ relative to the frequency $f$.

A principal object of this invention is to provide a frequency stabilization apparatus with a stability of $\pm 2\times 10^{-10}$ or better over a period of more than 90 days and having improved operating convenience, economy, and compactness.

A feature of this invention is the provision of a means within a frequency stabilization apparatus which means does not make the frequency controlled by the hyperfine frequency sensitive to slight frequency changes or amplitude changes in the modulation signal.

Another feature of this invention is the use of a sine wave modulation frequency having an even harmonic content smaller than $1\times 10^{-4}$ of any odd harmonic content therein.

Another feature of this invention is a means for regulating the operating temperature of the light absorption cell well over room temperature wherein any slight changes in room temperature will not affect the temperature of the absorption cell.

Another feature of this invention is to enclose the optical system and its temperature controlled oven within another temperature controlled oven that is maintained at a temperature above room temperature.

Another feature of this invention is a means to produce a 6834$^{13}/_{19}$ megacycle per second output from a controlled 5 megacycle oscillator.

Another feature of this invention is a means for making the hyperfine frequency of rubidium vapor equal to 6834$^{13}/_{19}$ megacycles.

Another feature of this invention is the provision of a proportional temperature control means and the incorporation of the means to a frequency stabilization apparatus.

These and other features and advantages of the present invention will be more apparent after a perusal of the following specification taken in connection with the accompanying drawings wherein, FIG. 1 is a cross-section of the optical package and associated block diagram control circuitry, and FIG. 2 is a schematic diagram, partly in block form, of a proportional temperature control circuit.

With reference to the drawings and to FIG. 1, in particular, the frequency stabilization apparatus has a rubidium lamp 11 which shines a collimated beam of light along an axis and through a rubidium filter cell 13 which contains preferably the rubidium isotope 85. The filter cell 13 is used to filter out the lower energy hyperfine components from each of the rubidium D lines from the lamp 11. The higher energy hyperfine components then pass through light absorption cell 14 which contains the rubidium isotope 87. The rubidium isotope 87 will undergo optical pumping and absorb some of the higher energy light photons. The intensity of light passing through the absorption cell 14 is detected by a photocell 16.

Since the temperature of the absorption cell 14 affects the hyperfine frequency of the alkali vapor, means are provided whereby the absorption cell 14 is maintained at a temperature which varies less than $^1/_{10}$ of one degree even though the ambient or room temperature changes as much as 30° C. The means includes a double oven arrangement whereby an outer oven chamber 17 encloses a lamp oven chamber 18 and also an absorption cell oven chamber 19. The outer oven 17 has preferably a cylindrical tubular aluminum casing 20 and aluminum end cover plates 21 and 22. The inner oven chamber 18 includes an aluminum cylindrical tube 24 enclosing the lamp 11 and filter cell 13. The tube 24 is supported within the oven 18 by aluminum rings 26 and 27 disposed at the ends thereof. The periphery of ring 26 bears against the inner surface of tubular casing 20 while ring 27 is bolted onto another aluminum ring 28 whose periphery in turn bears against the inner surface of casing 20. The operating temperature of the oven 18 is controlled by an electrical resistance heating coil 29 wound around the tube 24.

The inner oven chamber 19 consists primarily of a cavity resonator 31 that includes a short tube 32 having internal threads 33 at one end and two apertured end walls 34 and 36 closing the ends thereof. The apertured end wall 34 is brazed in place and apertured end wall 36 is threaded in place with the absorption cell 14 enclosed between the two. Since the cavity resonator 31 is tuned by threading end wall 36 into or out of the tube 32, a spacer ring 37 is required between the cell 14 and end wall 36 to hold the cell 14 firmly within the resonator 31. A heater coil 38 for the oven chamber 19 is wound around the short tube 32. The cavity resonator 31 is supported within the tubular casing 20 by metal rings 39 and 41. Ring 44 forms a spacer between the resonator 31 and the vacuum cell 30 and is preferably press fitted firmly into place. Then the members 28, 27, 24 and 26 are suitably bolted together and to a ring 44 while the members 39, 32 and 41 are suitably bolted together and also to the ring 44.

Since the heater 38 must maintain the operating temperature of the absorption cell 14 at a lower level than that at which the heater coil 29 maintains the temperature of the filter cell 13, an evacuated cell 45 is supported by the ring 28 and is used to maintain the temperature differential between the two ovens 18 and 19. A coupling loop 46 at the end of a coaxial line 48 couples high frequency energy into the cavity resonator 31 to cause it to resonate at a prescribed high frequency.

The outer oven chamber 17 is heated by two electrical resistance heating coils 51 and 52 which are wound around the outer surface of casing 20 and disposed within circumferential grooves 53 and 54 formed therein. A magnetic field of known value is aligned parallel to the axis of the light beam and is formed by a magnetic coil 56 wound around a plastic spool 58 that is in turn disposed around the aluminum casing 20. A tubular iron member 59 disposed around the coil 56 helps form the known value magnetic field by forming an inner magnetic shield. The outer oven chamber 17 with the inner oven chambers 18 and 19 disposed therein is enclosed within an outer magnetic shielding chamber 60 forming a magnetic shield for the absorption cell to shield the cell from extraneous magnetic fields. The chamber 60, like most magnetic shields, has three concentric tubular walls, a copper tubular wall 61 sandwiched between two iron tubular walls 62 and 63, and has iron cover plates 64, 66 closing the ends thereof. Plastic rings 67 and 68, disposed one at each end of the oven chamber 17, space the chamber 17 from the walls of chamber 60 to form an effective heat insulator around the oven 17 without evacuating the chamber 60 or the outer oven 17.

The apparatus has a suitable electrical power supply that is outlined in FIG. 1 in block form wherein a lamp oscillator power supply 71 energizes the lamp 11 while the heating coil 29 for the filter cell 13 is energized by a filter cell temperature controlled power supply 72. At the same time, the heater 38 for the absorption cell 14 is energized by gas cell temperature controlled power supply 73 while the temperature of oven 17 is controlled by an oven temperature controlled power supply 74 which supplies electrical energy to coils 51 and 52. A magnetic field of known value is formed within the shield 60 by the magnetic coil 56 powered by its direct current power supply 76.

The frequency which corresponds to the hyperfine resonant frequency of rubidium isotope 87 must be supplied to the cavity resonator and is derived from a five megacycle per second (mc.) oscillator 77 which has a separate oscillator temperature control circuit 78 to maintain the oscillator 77 at a constant temperature. The five mc. signal from the oscillator 77 must be synthesized by a suitable synthesizer to the hyperfine frequency value. The synthesizer consists of a regenerative divider and multiplier 79 which divides the five megacycles to a one megacycle reference signal. The regenerative divider and multiplier 79 then multiples the one megacycle to produce a six megacycle signal which is divided by 19 in a regenerative divider 81 to produce a $\frac{6}{19}$ mc. signal. The five megacycle signal from the oscillator 77 is also coupled to a frequency doubler 110 and phase modulator 82 whereby a ten megacycle modulated signal is obtained which is in turn multiplied by 12 by a multiplier 83 forming a 120 mc. modulated reference signal. The 120 mc. modulated reference signal and a $5\frac{6}{19}$ mc. reference signal, that was produced in a single sideband balanced modulator 84 by adding the 5 mc. signal from oscillator 77 and the $\frac{6}{19}$ mc. signal from the divider 81, are both applied to a multiplier 85, e.g., a voltage controlled diode or varactor, wherein the 120 mc. signal is multiplied by 57 to give a microwave frequency of 6840 mc. from which the $5\frac{6}{19}$ mc. signal is subtracted giving a lower sideband frequency which is $6834\frac{13}{19}$ mc. This last frequency is coupled to the resonator 31.

The hyperfine resonance frequency of rubidium 87 is dependent on the magnetic field strength surrounding the absorption cell 14 and also to the pressure of the buffer gas within the absorption cell 14. The hyperfine frequency of rubidium 87 has a value of 6,834,682,614 cycles per second with respect to the so-called "A 1 time," established by the Bureau of Standards. The hyperfine frequency is thus shifted by first adjusting the pressure of the buffer gas in the cell 14 until the frequency is about $6834\frac{13}{19}$ mc. Then the current in coil 56, which adjusts the magnetic field is varied so that the hyperfine frequency of the vapor sample in cell 14 is exactly equal to $6834\frac{13}{19}$ or 6834.684211 mc. This process of first adjusting the pressure of the sample and then the magnetic field requires only a very small magnetic field within oven chamber 17 for adjusting the frequency. Then, the current in coil 56 is also very small and therefore any slight current pulsations in the magnetic field supply circuit 76 does not appreciably affect the value of the shifted hyperfine frequency.

Another feature of this invention, as mentioned above, is the production of a sine wave which has an even harmonic content smaller than $1\times10^{-4}$ of any odd harmonic content therein. Sine wave function is produced by a modulation oscillator 86 which produces a sharp trigger spike or pulse at, for example, 214 times per second, twice the modulation frequency (107 c.p.s.) to drive a flip-flop circuit 87 and thereby to produce a square wave which has a frequency of 107 cycles per second. The square wave from the flip-flop circuit 87 is filtered by a filter 88 which filters the higher harmonic from the square wave and passes a pure fundamental frequency sine wave. The filtered sine wave is applied to a modulation amplitude and modulation phase control circuit 89 and then it is applied to a multiplier and phase modulator 82 wherein the ten megacycle signal produced is phase modulated over an angle of approximately 0.1 degree. By introducing this small phase modulation in the early stages of the frequency synthesizer, the necessity for using complex circuitry generally required for linear phase modulation over a large angle is avoided. In this invention the large linear phase angle modulation is produced by simply multiplying the modulated ten megacycle signal so that the phase angle is also multiplied. The ten megacycles is multiplied in multiplier 83 and also in the multiplier 85 to produce 6840 mc. that is phase modulated through an angle of approximately 114°.

The operation of the frequency stabilizer may be described in the following manner: Light from lamp 11 which primarily consists of photons which have only two energy components has the lower energy photons filtered out by filter cell 13. The vacuum cell 45 being glass is transparent to the higher energy photons from the lamp 11. The higher energy photons enter the absorption cell 14 through the aperture in the end wall 36 where some of the photons are absorbed by rubidium 87 causing the rubidium 87 to undergo optical pumping. Since the light absorbed in cell 14 diminishes as the vapor is pumped to higher energy levels, photocell 16 will observe an increasing light intensity. The cell 14 will be at maximum transparency when most all the rubidium 87 atoms are pumped to their higher energy level. Now, if cavity resonator 31 is excited at the hyperfine frequency which causes the atoms at the higher energy level to decay to the lower energy level, the transparency of the cell 14 will diminish. This change in light intensity will be also observed by the photocell 16. If the phase modulated frequency which is coupled into the resonator 31 is equal to the hyperfine frequency, the photocell 16 will observe a pulsating light intensity pulsating at a frequency which is twice (second harmonic) the frequency of modulation. If the phase modulated frequency is either higher or lower than the hyperfine frequency, the signal seen by the photocell 16 is a pulsating signal which has the frequency of the modulation frequency. The pulsating signal from the cell 16 is filtered by a filter amplifier 91 and only the frequency which corresponds to the modulation frequency is amplified. The amplified frequency signal is then applied to a phase detector 92 where the phase of this signal is compared to the phase of the signal from the flip-flop circuit 87 to produce a plus or minus voltage depending on whether the phase is advanced or retarded with respect to the direct signal from flip-flop circuit 87. The voltage is amplified in an operational amplifier 93 and is used to adjust the frequency of oscillator 77 to exactly 5 megacycles. A second harmonic indicator 94 may be used to visually determine if the apparatus is on frequency.

Since the servo system is sensitive to the second harmonic of the modulation frequency, any even harmonic component (overtones) in the modulation frequency will be obsreved by the photocell. Then, the servo system may probably tune the oscillator 77 to a value different than 5 megacycles since the photocell can see an even harmonic when the frequency of the oscillator is different from 5 mc. In accordance with this invention, all the even harmonic frequency components are removed or minimized within the sine wave as formed by the filter 88 so that the servo system is not sensitive to the even harmonics.

The apparatus is also temperature sensitive, in that a change in temperature of the absorption cell 14 changes the pressure therein to change in turn the hyperfine resonance frequency. Temperature control means are provided which very accurately control the temperature of the component parts. The outer oven 17 maintains the external temperature of the component parts of the apparatus above room or ambient temperature whereby any deviation in room temperature will not appreciably affect the interior temperature of oven chamber 17. Both the filter cell 13 and the absorption cell 14 are maintained at a higher temperature than oven 17 so that again any slight changes in the temperature of oven 17 has a much smaller effect on their temperatures. Since the cells 13 and 14 must be at different temperatures to operate efficiently each of the heater coils 29 and 38 have separate temperature control units. A typical temperature control circuit which will maintain a constant temperature for the device is shown in FIG. 2 and will be referred to hereinafter as a proportional temperature control means. The proportional temperature control means has a thermistor 96 which is located close to the member that is to be temperature controlled, since the resistance of a thermistor is sensitive to temperature. A typical installation of the proportional temperature control means will be described in conjunction, for example, with the heater for an absorption cell 14 and oven 19. The thermistor 96 is located in a convenient manner close to the body 32 of the cavity resonator 31 so that its resistance is affected only by the temperature of the resonator 31. This arrangement is shown by a dotted outline 97 in which heater 38 is also located. The thermistor 96 is series connected to a variable resistor 98 and a secondary winding 99 of a transformer 100. The secondary winding 99 is grounded somewhere between its ends, while the junction of the thermistor 96 and the resistor 98 is connected to a grounded amplifier 101. A primary coil 102 of the transformer 100 is connected to an oscillator 103. The oscillator 103 is also connected to a phase detector 104 to which the amplifier 101 is also connected. The heater 38 and its power supply 73' are series connected to a current control means and, in this embodiment, to the emitter and to the collector of a transistor 105. The base of the transistor 105 is connected to the phase detector 104.

The circuit operates as follows: As the heater 38 heats the member 97, the resistance of the thermistor 96 changes, thus changing the current to the amplifier 101. Since the thermistor 96 is of the type wherein its resistance decreases with temperature, the phase of the current to the amplifier 101 is determined by the windings in one-half of the secondary 99 until the resistance of the thermistor 96 is equal to the resistance of resistor 98. Then, when the resistance of the thermistor is further lowered as the temperature of the thermistor 96 is further increased, the current to amplifier 101 will be determined by the other half of the winding of the secondary 99. The phase of the current to the amplifier 101 may change 180° depending on which half of the secondary 99 determines the direction of current. The phase detector 104 produces a direct current signal whose voltage is proportional to the amplitude of the current to the amplifier 101 and the signal polarity is dependent on whether the current to amplifier 101 is in-phase or out-of-phase with the oscillator. The direct current signal is applied to the base of the transistor 105 and the current through the transistor is then proportional to the voltage signal from the phase detector and in turn to the temperature of the thermistor 96. The current as more power is needed or not needed to the heater is gradually increased or decreased to produce a very constant temperature. When the member is at the correct temperature just enough current passes through the transistor 105 to maintain the temperature.

The temperature of member 97 is regulated by adjusting the resistor 98. Of course, the polarity of the transistor must match the polarity of the voltage from the phase detector. That is, if the transistor is a P-N-P type as illustrated a negative voltage on the base will cause the transistor to conduct current. A positive or zero voltage will make the transistor non-conductive. Since the thermistor 96 decreases in resistance as it gets hotter, then the in-phase current to the amplifier must produce a negative direct current voltage in the phase detector. Then, as the thermistor becomes hotter, the in-phase signal will diminish in amplitude and the biasing voltage to the base will decrease thus diminishing the current through the transistor. Since this circuit served as a proportional temperature control and the temperature of oven 17 is above ambient, there is little likelihood that the ovens will become hotter than their standard operating temperature and the transistor will always conduct enough current to maintain a constant temperature in the ovens.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A frequency stabilization apparatus including a light source for projecting a light beam, a light absorption cell enclosed within a cavity resonator for intercepting said light beam, a light intensity means for detecting the intensity of the light beam after passing through said cell, an oscillator for generating a radio frequency that is coupled to the cavity resonator, circuit means for producing a square wave function, filter means for changing said square wave function to a pure fundamental sine wave function substantially free of even harmonics, a modulator means for phase modulating said radio frequency and controlled by said sine wave, and a phase detector means coupled to said light intensity means and to said oscillator for tuning said oscillator in accordance with the light intensity detected by said light intensity means.

2. The apparatus of claim 1 wherein said circuit means comprises a pulse generator for generating pulses of a predetermined frequency at a uniform time interval, and a flip-flop circuit that produces a low frequency square wave at a submultiple of such predetermined frequency, said flip-flop circuit being controlled by said pulse generator.

3. A frequency stabilization apparatus including a light source for projecting a light beam, first heater means for maintaining said light source at a constant temperature, a light absorption cell enclosed within a cavity resonator for intercepting said light beam, second heater means for maintaining said absorption cell at a constant temperature which is different than the temperature at which the light source is maintained, a light intensity means for detecting the intensity of the light beam after passing through said cell, a third heater means enclosing said first heater means and said second heater means and for controlling the temperature thereto above ambient temperature, an oscillator for generating a radio frequency that is coupled to said cavity resonator, circuit means for producing a square wave function, filter means for changing said square wave function to a sine wave function, a modulator means for phase modulating said radio frequency and controlled by said sine wave, and a phase detector means coupled to said light intensity means and to said oscillator for timing said oscillator relative to the light intensity detected by said light intensity means.

4. The apparatus of claim 3 wherein said circuit means comprises a pulse generator for generating pulses at a uniform time interval, and a flip-flop circuit that produces a low frequency square wave function, said flip-flop circuit being controlled by said pulse generator.

5. The apparatus of claim 3 wherein a magnetic shielding means encloses said light source and said light absorption cell, and magnetic coil means is disposed within said magnetic shielding means for forming a magnetic field aligned parallel to an axis passing through said light source, said absorption cell and said light intensity means.

6. The apparatus of claim 5 wherein said magnetic shielding means comprises a tubular member made primarily of iron and end plates also made primarily of iron closing the end of said tubular member; said light source, said absorption cell, said first heater means, said second heater means, and said third heater means are enclosed within said tubular member.

7. A frequency stabilization apparatus including a light source for projecting a light beam, first heater means for maintaining said light source at a constant temperature, a light absorption cell enclosed within a cavity resonator for intercepting said light beam, second heater means for maintaining said absorption cell at a constant temperature which is different than the temperature at which the light source is maintained, a light intensity means for detecting the intensity of the light beam after passing through said cell, a third heater means enclosing said first heater means and said second heater means and for controlling the temperature therein to above ambient temperature.

8. The apparatus of claim 7 wherein at least one of the heater means comprises an electrical resistance coil, a power supply for said resistance coil and a proportional temperature control means for regulating the current in said coils in relation to the temperature of said coils.

9. The apparatus of claim 8 wherein said proportional temperature control means comprises resistance means whose resistance valve is sensitive to temperature, an oscillator coupled to said resistance means, a phase detector coupled to said resistance means and to said oscillator, said phase detector producing a direct current signal proportional to the resistance of said resistance means, a current control means connected in series with said power supply and said heater, the output of said phase detector controlling the amount of current flowing through said current control means.

10. The apparatus of claim 8 wherein said portional temperature control means comprises a transformer, an oscillator coupled to the primary of said transformer, a thermistor and a resistor series connected to the secondary of said transformer, the secondary of said transformer being grounded at a point between its ends, a grounded amplifier connected to the junction of said thermistor and said resistor, a phase detector connected to said amplifier and said oscillator, and a transistor, the output of said phase detector connected to the base of said transistor, the emitter and collector of said transistor series connected with said heater coil and said power supply.

11. The apparatus of claim 8 wherein said proportional temperature control means comprises resistance means whose resistance valve is sensitive to temperature, an oscillator coupled to said resistance means, a phase detector coupled to said resistance means and to said oscillator, said phase detector producing a direct current signal proportional to the resistance of said resistance means, a heater means, a power supply for said heater means, a current control means connected in series with said power supply and said heater means, the output of said phase detector controlling the amount of current flowing through said current control means.

12. A frequency stabilization apparatus including a light source for projecting a light beam, a light absorption cell enclosed within a cavity resonator for intercepting said light beam, a light intensity means for detecting the intensity of the light beam after passing through said cell, an oscillator for generating a radio frequency that is coupled to said cavity resonator, a frequency synthesizer means for making the frequency value of the radio frequency a given frequency value in the radio frequency range, said synthesizer means comprising a first frequency divider means coupled to said oscillator for first dividing the frequency of said oscillator by a whole number and then multiplying the divided-frequency by another whole number, a second frequency divider means for dividing by a whole number the frequency from said first divider means, a modulator means for adding the frequency from said oscillator to the frequency from said second divider means, a frequency multiplier means for multiplying the frequency from said oscillator by a whole number and a circuit means coupled to said frequency multiplier means and to said modulator means for first multiplying the frequency from said multiplier means and then adding the frequency from said modulator means to the multiplied frequency to produce said frequency value.

13. A frequency stabilization apparatus including a light source for projecting a light beam, a light absorption cell enclosed within a cavity resonator for intercepting said light beam, a light intensity means for detecting the intensity of the light beam after passing through said cell, an oscillator for generating a radio frequency and coupled to the cavity resonator, frequency synthesizer means for making the frequency value of the radio frequency a given frequency value in the radio frequency range, said synthesizer means comprising a first divider means coupled to said oscillator for first dividing the frequency of said oscillator by a whole number and for then multiplying the divided-frequency by another whole number, a second divider means for dividing by a whole number the frequency from said first divider means, first modulator means for adding the frequency from said oscillator to the frequency from said second divider means, a frequency multiplier means for multiplying the frequency from said oscillator by a whole number, first circuit means coupled to said frequency multiplier means and to said modulator means for first multiplying the frequency from said multiplier means and for then adding the frequency from said modulator means to the multiplied frequency to produce said given frequency value, second circuit means for producing a square wave function, filter means for changing said square wave function to a sine wave function, second modulator means for phase modulating said radio frequency and controlled by said sine wave, and a phase detector means coupled to said light intensity means and to said oscillator for tuning said oscillator relative to the light intensity detected by said light intensity means.

14. A frequency stabilization apparatus including a light source for projecting a light beam, first heater means for maintaining said light source at a constant temperature, a light absorption cell enclosed within a cavity resonator for intercepting said light beam, second heater means for maintaining said absorption cell at a constant temperature which is different than the temperature at which the light source is maintained, a light intensity means for detecting the intensity of the light beam after passing through said cell, a third heater means enclosing said first heater means and said second heater means and for controlling the temperature therein to above ambient temperature, an oscillator for producing a radio frequency, a frequency synthesizer means for making the frequency value of the radio frequency a given frequency value in the radio frequency range, said synthesizer means comprising first divider means coupled to said oscillator for first dividing the frequency of said oscillator by a whole number and then multiplying the divided-frequency by another whole number, second divider means for dividing by a whole number the frequency from said first divider means, a modulator means for adding the frequency from said oscillator to the frequency from said second divider means, a frequency multiplier means for multiplying the frequency from said oscillator by a whole number, and circuit means coupled to said frequency multiplier means and to said modulator means for first multiplying the frequency from said multiplier means and then adding the frequency from said modulator means to the multiplied frequency to produce the given frequency value.

15. A frequency stabilization apparatus including a light source for projecting a light beam, first heater means for maintaining said light source at a constant temperature, a light absorption cell enclosed within a cavity resonator for intercepting the light beam, second heater means for maintaining said absorption cell at a constant temperature which is different than the temperature at which the light source is maintained, a light intensity means for detecting the intensity of the light beam after passing through said cell, a third heater means enclosing said first heater means and said second heater means and for controlling the temperature therein to above ambient temperature, an oscillator for producing a radio frequency, frequency synthesizer means for making the frequency value of the radio frequency a given frequency value in the radio frequency range, said synthesizer means comprising first divider means coupled to said oscillator for first dividing the frequency of said oscillator by a whole number and then multiplying the divided-frequency by another whole number, second divider means for dividing by a whole number the frequency from said first divider means, first modulator means for adding the frequency from said oscillator to the frequency from said second divider means, a frequency multiplier means for multiplying the frequency from said oscillator by a whole number, first circuit means coupled to said frequency multiplier means and to said modulator means for first multiplying the frequency from said multiplier means and then adding the frequency from said modulator means to the multiplied frequency to produce the given frequency value, second circuit means for producing a square wave function, filter means for changing said square wave function to a sine wave function, second modulator means for phase modulating said radio frequency and controlled by said sine wave, and a phase detector means coupled to said light intensity means and to said oscillator for tuning said oscillator relative to the light intensity detected by said light intensity means.

16. The apparatus of claim 15 wherein said second circuit means comprises a pulse generator for generating pulses at a uniform time interval, and a flip-flop circuit for producing a low frequency square wave function, said flip-flop circuit being controlled by said pulse generator.

17. The apparatus of claim 15 wherein a magnetic shielding means encloses said light source and said light absorption cell, and magnetic coil means is disposed within said magnetic shielding means for forming a magnetic field aligned parallel to an axis passing through said light source, said absorption cell and said light intensity means.

18. The apparatus of claim 15 wherein at least one of the heater means comprises an electrical resistance coil, a power supply for said resistance coil and a proportional temperature control means for regulating the current in said coils in relation to the temperature of said coils.

19. The apparatus 18 wherein said proportional temperature control means comprises resistance means whose resistance valve is sensitive to temperature, an oscillator coupled to said resistance means, a phase detector coupled to said resistance means and to said oscillator for producing a direct current signal proportional to the resistance of said resistance means, a current control means connected in series with said power supply and said heater, so that the output signal of said phase detector controls the amount of current flowing through said current control means.

References Cited

UNITED STATES PATENTS 2,883,540 4/1959 Grant ---------------- 331—3

OTHER REFERENCES

Andres et al.: IRE Transactions on Military Electronics, "Design Studies for a Rubidium Gas Cell Frequency Standard," pp. 178–183, pub. October 1959.

Holloway et al.: Proceeding of the IRE, "Comparison and Evaluation of Cesium Atomic Beam Freq. Standards," pp. 1730–1736, pub. October 1950.

Radio and Television News, "Atomichron," pp. 63, 120, pub. January 1957.

Townes: Quantum Electronics, QC, 447, C56, C.2, pp. 110–119, pub. by Columbia Univ. Press, 1960.

JOHN KOMINSKI, *Primary Examiner.*

ROY LAKE, NATHAN KAUFMAN, *Examiners.*